March 20, 1956  C. C. HOUTZ ET AL  2,739,275
STABILIZATION OF ELECTROLYTIC CAPACITORS
Filed June 20, 1952
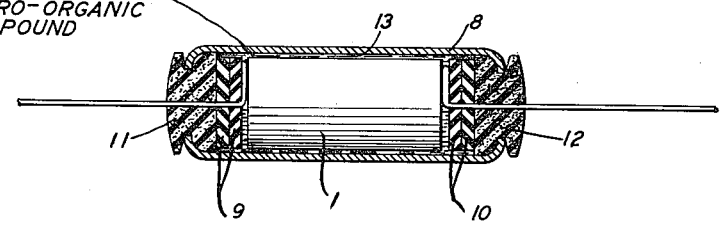
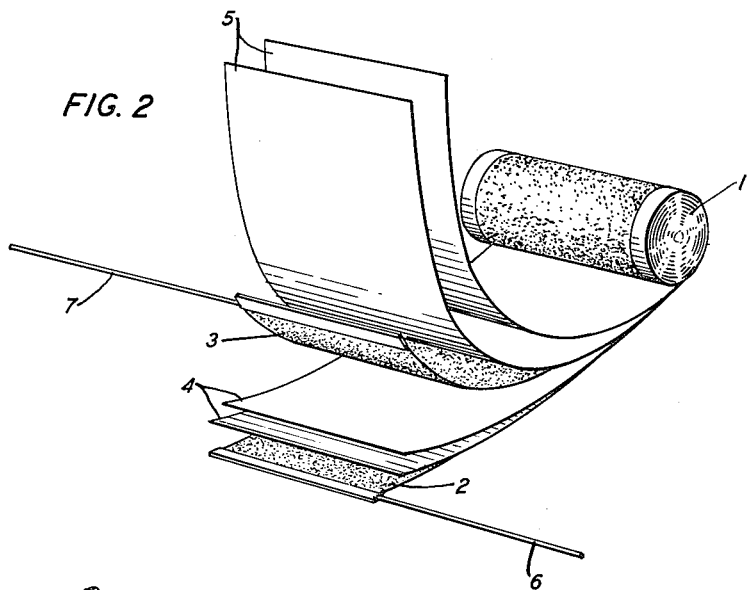
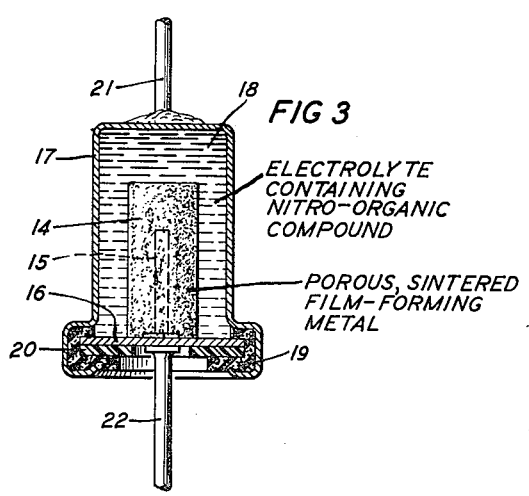
INVENTORS C. C. HOUTZ
D. A. McLEAN
BY Edwin B. Cave
ATTORNEY

2,739,275

STABILIZATION OF ELECTROLYTIC CAPACITORS

Charles C. Houtz, Bernardsville, and David A. McLean, Chatham, N. J., assignors to Bell Telephone Laboratories, Incorporated, New York, N. Y., a corporation of New York Application June 20, 1952, Serial No. 294,651

14 Claims. (Cl. 317—230)

This invention relates to electrolytic capacitors and more particularly it relates to electrolytic capacitors containing electrolytes embodying substances which act to stabilize the capacitors against deterioration of their electrical properties.

It is a characteristic of electrolytic capacitors that they tend to decrease in capacity and to increase in power factor during use. It is also often a characteristic of electrolytic capacitors to increase in direct-current leakage current when first put into use until a peak of leakage current is reached after which the leakage tends to decrease.

These electrolytic capacitors are made up of a pair of electrodes at least one of which is made of a metal which has an oxide film formed anodically on its surface, the oxide film being in contact with a conductive electrolyte. The deterioration of capacity and power factor of these capacitors appears to be associated with a progressive change in this oxide film during use. Thus, with tantalum electrodes, the original film is a smooth layer exhibiting an interference color depending upon the film thickness which is in turn dependent upon the voltage at which the film was formed. During the use of the capacitor this oxide film gradually becomes a dull gray and the degree of deterioration of electrical properties progressively increases as the graying progresses. Analogous effects occur with electrodes made of other film-forming metals.

The present invention is based on the discovery that the stable nitro-organic compounds, particularly those soluble to a substantial extent in the electrolytes of the capacitors, act to retard both the deterioration of electrical properties of electrolytic capacitors and the rate of graying, or analogous modification, of the oxide film referred to above. Examples of capacitors stabilized according to the present invention are shown in the accompanying drawing in which:

Fig. 1 is a front elevation, in section, of a rolled foil type electrolytic capacitor, sealed within a can;

Fig. 2 is a perspective view of the condenser unit of Fig. 1 outside the can and partly unrolled to show its construction; and Fig. 3 is a front elevation, in section, of an electrolytic capacitor having a porous anode formed of sintered metal powder.

In the form of capacitor shown in Figs. 1 and 2 the condenser unit 1 is of the rolled foil type, being made up of a pair of foils 2, 3 formed of a film-forming metal such as tantalum, aluminum, magnesium or beryllium having anodically formed oxide films on their surfaces and spaced from one another by double layers 4, 5 of a low density condenser paper, such as low density kraft paper. The assembly of foil and paper is rolled into a compact cylinder. Metal terminals 6, 7, preferably formed of the same metal as the foils are fastened to the ends of the respective foils as by spot welding.

The condenser unit 1, impregnated with an electrolyte containing one of the stabilizers of the present invention, is enclosed in a tubular can 8 formed of a suitable material such as silver or silver-plated copper. The terminals 6, 7 extend from the respective ends of the tubular can 8, passing successively through disc-shaped insulating spacers 9, 10 and cylindrical rubbery sealing plugs 11, 12. The two ends of the tubular can 8 are crimped over the respective sealing plugs 11, 12 so as to form a tight seal. The free space within the can is filled with electrolyte 13 containing one of the stabilizers of the present invention.

In the form of condenser shown in Fig. 3, an anode 14 is formed of a body of a powder of a film-forming metal, preferably tantalum, sintered about a central pin 15 which is formed of the same metal as the sintered body and which is welded to a base plate 16, also formed of the same metal. A can 17 formed of a suitable metal, such as silver, encloses said anode 14 and itself acts as the cathode. The can, which contains an electrolyte 18 containing a stabilizer of the present invention, is sealed by crimping its ends over a gasket 19 formed of a rubbery insulating material which surrounds the base plate 16 and the adjacent insulating washer 20, which may suitably be formed of a plastic. A cathode terminal lead 21 is fastened to the can 17 in any suitable manner as by soldering. An anode lead 22 is welded to the base plate 16.

The stabilizers of the present invention are effective with any of the common electrolytes which are used in electrolytic capacitors. In the rolled foil type condenser, such as shown in Figs. 1 and 2, it is common to use a viscous type electrolyte, such as an aqueous or non-aqueous glyco-borate. Thus, a suitable electrolyte can be made up of about 50 per cent ethylene glycol, 15 per cent ammonium borate and 35 per cent water.

In a porous electrode type of electrolytic capacitor, as shown in Fig. 3, it is usually desirable to use a relatively fluid electrolyte to permit complete permeation of the pores. A suitable electrolyte for such a purpose is an aqueous solution of lithium chloride. As stated above the stabilizers of the present invention are effective with all these electrolytes and with the other electrolytes which can be used in electrolytic capacitors.

As stated above, the stabilizers of the present invention are nitro-organic compounds. It has been established that it is the nitro group in these compounds which is responsible for the stabilizing action so that the chemical structure of the remainder of the molecule is not of significance from the standpoint of determining whether or not stabilization will take place. However, other radicals present in the nitro-organic compound may have different effects upon the activity of the nitro group so that the stabilizing effectiveness of some nitro compounds will be greater than that of others.

The stabilizers may be nitro-hydrocarbons but preferably the compounds also contain one or more other polar groups, such as hydroxyl or amino groups, to increase the solubility of the stabilizer in the electrolyte. The presence of sulfonic groups is, however, to be avoided since their acidity results in an attack upon the oxide film of the electrodes. Since the metals higher in the electrochemical series form oxides which are more sensitive to acidity, electrolytic capacitors formed with aluminum electrodes, for instance, will be more sensitive to acidity of the electrolyte than will capacitors formed with tantalum electrodes.

Stabilizers which have a dissociation constant not greater than $10^{-5}$ at 25° C. will be unobjectionable from the standpoint of acidity. The dissociation constant $k$ is defined by the equation $$k = \frac{a^2}{v(1-a)}$$

where:

$v$=the volume, in liters, of solution containing 1 gram molecular weight of the acidic substance;
$a$=the fraction of acid ionized;
$1-a$=the fraction of acid not ionized.

It is also necessary that the stabilizer be stable against such chemical reaction with the electrolyte as will be destructive of its nitro-organic structure and against chemical decomposition at both the temperature of operation of the capacitor and the temperature at which the capacitor is impregnated with the electrolyte. The nitro-aromatic compounds, that is, the aromatic compounds having nitro radicals bonded directly to their aromatic rings, are therefore particularly suitable for the purposes of the present invention because of their high chemical stability. Those nitro-aliphatic compounds which are stable under the conditions set forth above are also suitable for the purposes of the present invention.

The following tables will illustrate the stabilization of capacity and power factor and the reduction of peak direct-current leakage which is achieved by the addition of nitro-organic compounds to the electrolytes of electrolytic condensers. In Table 1 below results are given for a series of tests run on electrolytic capacitors having tantalum foil electrodes, separated by two layers of low density kraft paper each one-half mil in thickness. The electrodes were formed under a direct-current forming voltage of 200 volts at 100° C. in an aqueous glycoborate electrolyte. As is conventional, forming was continued until the leakage current decreased to a minimum value. The capacitors were impregnated with the aqueous electrolyte made up of ethylene glycol, ammonium borate and water which was described above. The capacitors were placed on test under a potential of 150 volts at 85° C. for 2,000 hours.

Measurements were made at the end of the test of the loss of capacity in per cent of the initial capacity at the start of the test. Measurements were also made of the power factor at the end of the test and of the peak value of direct-current leakage current reached during the test. The measurements of capacity and power factor were made at 60 cycles. Tests were made on capacitors containing no added stabilizer and containing varying amounts of differential stabilizers as shown in the table.

Table 1

| Additive | Loss of Capacity, Percent | Power Factor, Percent | Peak of D. C. Leakage During Test, Microamperes |
|---|---|---|---|
| None | 41.8 | 8.0 | 25.4 |
| 2% o-nitroaniline | 6.0 | 5.6 | 7.0 |
| 3% nitrobenzene | 29.0 | 5.9 | 18.3 |
| 5% p-nitrophenol | 29.8 | 6.1 | 21.9 |

In Table 2 below, are recorded the results of tests on condensers which were similar except that the formation was carried out at 150 volts at 200° C. and except that the test was carried on for 1,000 hours:

Table 2

| Additive | Loss of Capacity, Percent | Power Factor, Percent | Peak of D. C. Leakage During Test, Microamperes |
|---|---|---|---|
| None | 7.7 | 6.1 | 6.5 |
| 2% p-nitroaniline | 3.2 | 3.0 | 4.3 |
| 2% 2 nitro 2 methyl 1 propanol | 2.2 | 2.4 | 3.6 |
| 2% 2,4 dinitro 4 hydroxy diphenylamine | 3.6 | 1.2 | 3.8 |

Representative proportions of the added stabilizers are given in the tables above. It is ordinarily desirable that at least .05 per cent by weight and preferably at least 1 per cent by weight of the stabilizer be added to the electrolyte. A desirable range of proportions of stabilizer is from 2 per cent to 10 per cent or to the limit of solubility in the electrolyte. It ordinarily serves no useful purpose to add a greater amount of stabilizer than is soluble in the electrolyte at the temperature of impregnation. Regardless of solubility, the stabilizers will ordinarily not be added in amounts greater than 15 per cent, although larger amounts may obviously be added if desired. The stabilizers are ordinarily added by dissolving them in the electrolyte before the electrolyte is added to the capacitor. In the foil type capacitors the impregnation of the capacitor with the stabilized electrolyte is ordinarily accomplished at an elevated temperature, such as about 110° C., with the intermittent application of partial vacuum. An additional amount of the stabilized electrolyte is ordinarily also added to the container in which the impregnated capacitor is placed. In the sintered anode capacitor, the impregnation of the porous anode can also be accomplished in a similar manner, as by the application intermittently of a partial vacuum, using an electrolyte at a temperature of about 90° C.

The invention has been described above in terms of specific embodiments and, since certain modifications and equivalents may be apparent to those skilled in the art, this description is intended to be illustrative of, but not necessarily to constitute a limitation upon, the scope of the invention.

What is claimed is:

1. An electrolytic capacitor comprising a pair of electrodes at least one of which is formed of a film-forming metal having a dielectric surface coating of an oxide of said metal and a glyco-borate electrolyte in contact with said electrodes, said electrolyte having dissolved therein between .05 per cent and 15 per cent by weight of ortho-nitroaniline.

2. An electrolytic capacitor as described in claim 1 wherein the film-forming metal is tantalum.

3. An electrolytic capacitor as described in claim 1 wherein the film-forming metal is aluminum.

4. An electrolytic capacitor comprising a pair of foil electrodes formed of a film-forming metal having a dielectric surface coating of an oxide of said metal, said foils being spaced by sheets of porous insulating material impregnated with a glyco-borate electrolyte having dissolved therein between .05 per cent and 15 per cent by weight of a nitro-organic compound, the molecules of which consist of a hydrocarbon having substituted thereon as its sole substituents a nitro group and at least one substituent selected from the group consisting of hydroxyl groups and amino groups.

5. An electrolytic capacitor as described in claim 4 wherein the nitro-organic compound is 2 nitro 2 methyl 1 propanol.

6. An electrolytic capacitor as described in claim 4 wherein the nitro-organic compound is para-nitrophenol.

7. An electrolytic capacitor comprising a pair of electrodes at least one of which is formed of a film-forming metal having a dielectric surface coating of an oxide of said metal and a glyco-borate electrolyte in contact with said electrodes, said electrolyte having dissolved therein between .05 per cent and 15 per cent by weight of a nitro-organic compound which has a dissociation constant not greater than $10^{-5}$ at 25° C.

8. An electrolytic capacitor as described in claim 7 wherein the nitro-organic compound is a nitro-aromatic compound.

9. An electrolytic capacitor as described in claim 8 wherein the electrodes are foil electrodes which are spaced by sheets of porous insulating material impregnated with the electrolyte.

10. An electrolytic capacitor as described in claim 9 wherein the electrodes are formed of tantalum.

11. An electrolytic capacitor as described in claim 9 wherein the electrodes are formed of aluminum.

12. An electrolytic capacitor as described in claim 7 wherein the nitro-organic compound is nitrobenzene.

13. An electrolytic capacitor as described in claim 7 wherein the nitro-organic compound is a nitroaniline.

14. An electrolytic capacitor as described in claim 7 wherein the nitro-organic compound is a nitrophenol.

References Cited in the file of this patent

UNITED STATES PATENTS

| | | |
|---|---|---|
| 1,918,717 | Ruben | July 18, 1933 |
| 2,024,210 | Edelman | Dec. 17, 1935 |
| 2,037,848 | Brennan | Apr. 21, 1936 |
| 2,185,238 | Whaley | Jan. 2, 1940 |
| 2,346,635 | Pabst et al. | Apr. 11, 1944 |

OTHER REFERENCES

Bell Laboratories Record, October 1950, pages 448–452.